March 21, 1944.                A. SCHWARZ                2,344,645
                  PHOTOGRAPHIC SHUTTER OPERATING MECHANISM
                  Filed Aug. 16, 1941            3 Sheets-Sheet 2
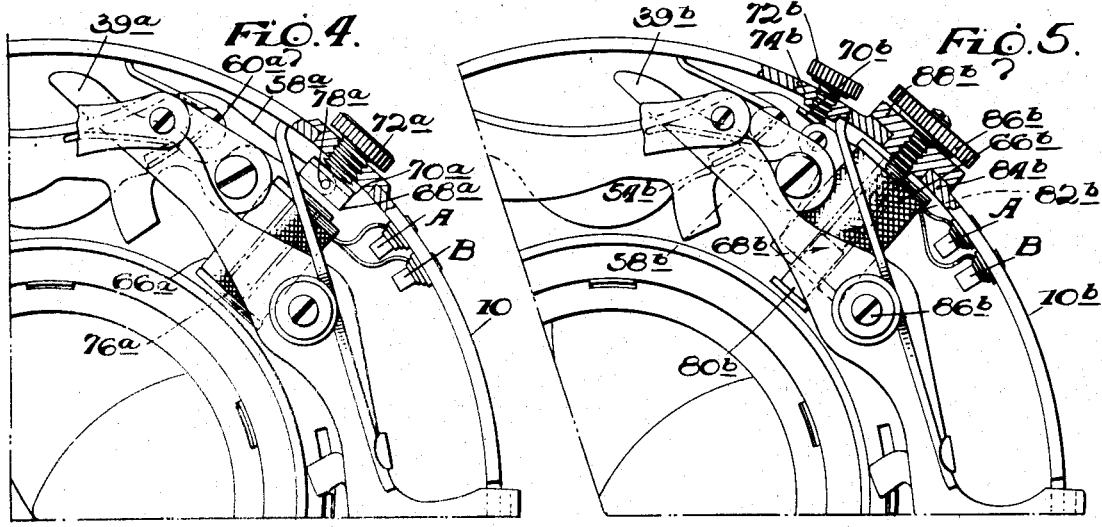
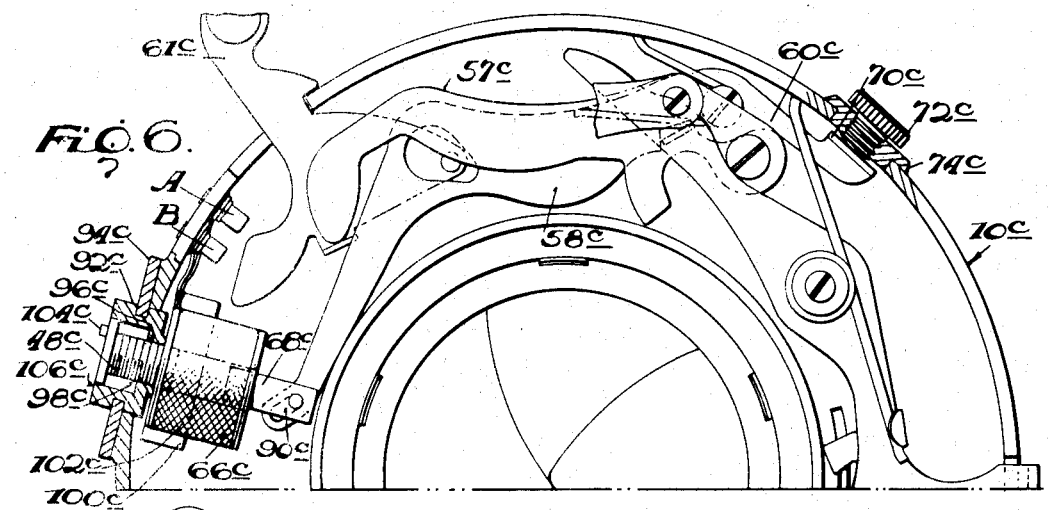
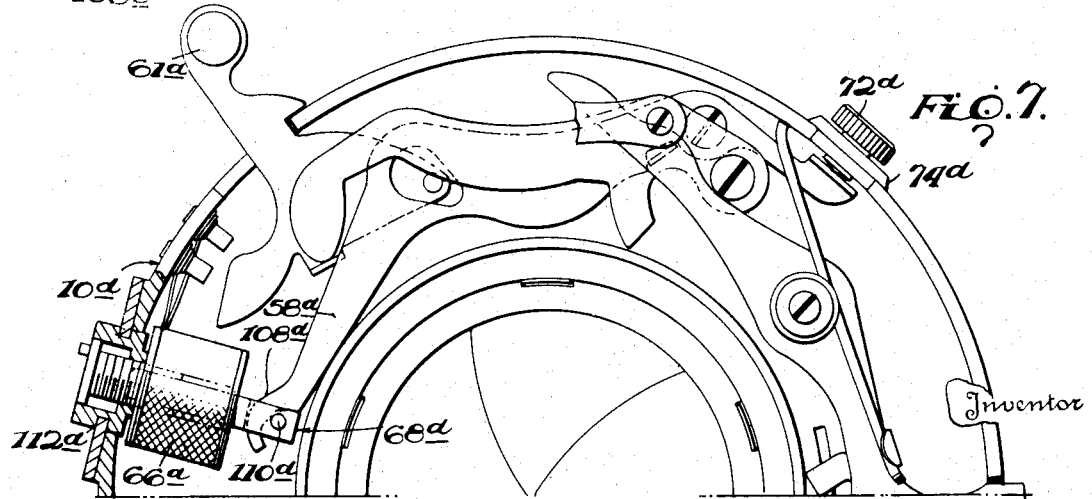
Inventor
Alfred Schwarz.
By
        Attorney March 21, 1944. A. SCHWARZ 2,344,645
PHOTOGRAPHIC SHUTTER OPERATING MECHANISM
Filed Aug. 16, 1941 3 Sheets-Sheet 3
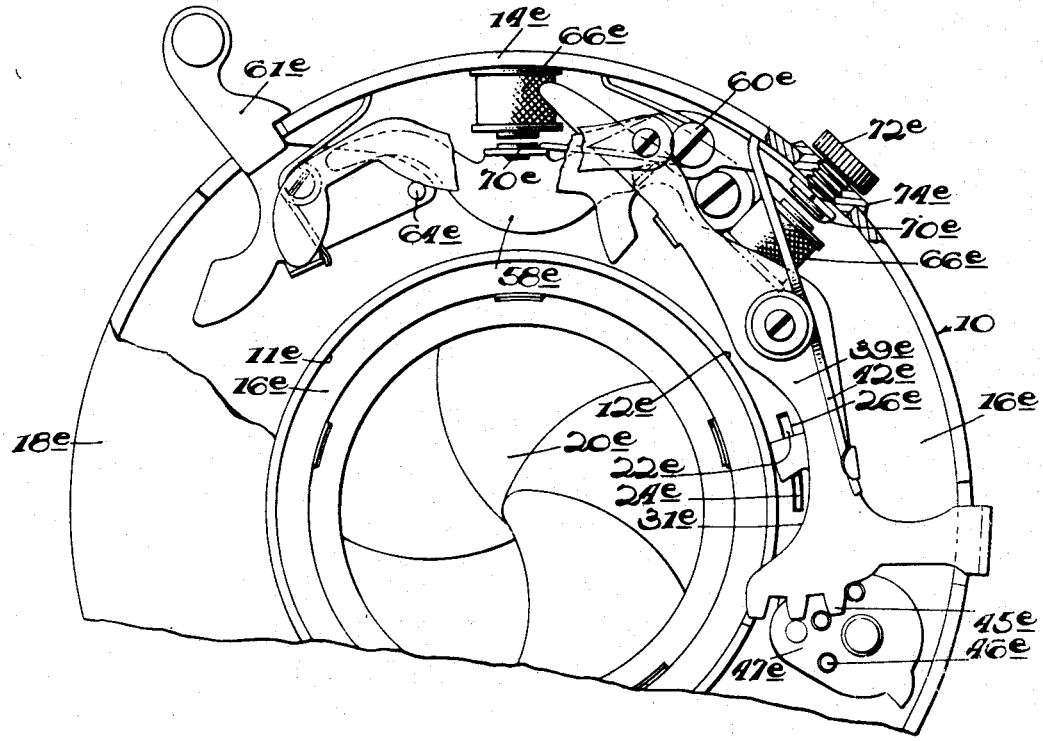
Inventor
Alfred Schwarz
By
Attorney Patented Mar. 21, 1944

2,344,645

UNITED STATES PATENT OFFICE 2,344,645

PHOTOGRAPHIC SHUTTER OPERATING MECHANISM

Alfred Schwarz, Rochester, N. Y., assignor to Ilex Optical Company, Rochester, N. Y., a corporation of New York Application August 16, 1941, Serial No. 407,210

10 Claims. (Cl. 95—53)

The present invention relates to photographic shutter-operating mechanism and more particularly to devices for synchronizing the operation of a camera shutter with the discharge of an electrically actuated flash lamp. Still more specifically, the invention relates to an electromagnetically operated shutter actuating and synchronizing mechanism which, when installed in the shutter casing of a camera, will insure maximum opening of the shutter at the instant of maximum or peak brilliancy of the flash.

While the mechanism herein described is particularly well adapted for use in effecting actuation of the camera shutter and energization of the flash bulb in timed relation as set forth above, the same may be employed for performing the shutter actuating function alone without the use of a flash bulb.

Heretofore various synchronizing devices utilizing the principles of electromagnetism have been employed both for actuating a camera shutter and for effecting synchronization of the shutter movements with the firing of a flash bulb. Inasmuch as the average camera shutter requires a considerable degree of force to effect its opening and closing movements, the solenoid coils required for this purpose have been extremely heavy and bulky and have occupied so much space that building of the various control instrumentalities inside the shutter casing has been out of the question for economic reasons as well as for practical reasons. Furthermore, due to the low resistance of the power-consuming solenoid coils, excessively high current drain has resulted upon each energization thereof and this has resulted in frequent battery replacement.

The present invention is designed to overcome the above noted limitations that are attendant upon the use of electromagnetic shutter actuating devices, and accordingly it is among the principal objects of the present invention to provide a shutter actuating and synchronizing device which is relatively compact and light in weight and which occupies a minimum of space, thereby permitting the same to be built into a camera shutter casing and concealed therein. Another and equally important object of the invention is to provide such a device which is so designed that the solenoid coil or coils provided do not in themselves effect mechanical motion of the shutter parts, but merely release a source of energy by means of which these parts may be actuated. Thus, the coil or coils may be of extremely small capacity and of small size, thereby permitting the use of batteries which are small, both in size and in capacity while at the same time prolonging their normal life.

A still further object of the invention is to provide an electromagnetic shutter actuating and synchronizing device of the character set forth above which may be permanently installed within a shutter casing so as to be concealed therein and remain a permanent part of the camera equipment, yet which will in no way interfere with the normal operation of the shutter if it is desired to operate the same manually and independently of the synchronizing mechanism.

Another object of the invention is to provide an electromagnetically operated synchronizing device which is adjustable insofar as its timing is concerned to accommodate flash bulbs having different time lag characteristics.

Still another object of the invention is to provide an adjustable synchronizing device of this character which, when adjusted to the requirements of the particular time lag characteristics of a bulb of one manufacture, will operate uniformly and consistently for all bulbs having identical time lag phenomena.

Another object is to provide an apparatus of this character wherein the settings for various types of bulbs are readily reproducible as for example when bulbs having different time lag characteristics are used alternately.

Yet another object of the invention is to provide an electromagnetically actuated shutter operating mechanism capable of use either with or without a photoflash synchronizing mechanism which may be controlled either at the camera or at varying distances therefrom without varying any of the adjustments or altering the operation of the apparatus.

A further object of the invention is to provide a shutter actuating and synchronizing device which in no way interferes with the normal operation of the shutter regardless of the particular fraction of a second to which the shutter may be set or of whether the shutter is to operate on a "time" or a "bulb" setting.

The provision of an electromagnetically operated synchronizing apparatus which will secure extreme accuracy in synchronization; one which is simple, reliable and stable in its operating characteristics; one which is comprised of a minimum number of moving parts and which is therefore unlikely to get out of order; one which is not expensive to manufacture nor difficult to assemble; one which is, for the most part, enclosed within the shutter casing and which therefore is protected from moisture and dust, and one which requires no particular degree of skill for its operation, are further desirable features that have been considered in the production and development of the present invention.

With these and other objects in view, which will become more readily apparent as the nature of the invention is better understood, the same consists in the novel combination, construction and arrangement of parts shown in the accompanying two sheets of drawings, in which:

Figure 4 is a fragmentary view similar to Fig. 2 showing a modified form of the invention.

Figure 5 is a similar fragmentary view showing another form of the invention.

Figure 6 is another similar view showing a further modified form of the invention.

Figure 7 is a detailed fragmentary view showing a modified form of solenoid coil and core connection capable of use in connection with the invention.

Figure 8 is a fragmentary view similar to Figs. 2 to 6 inclusive showing a further modification of the invention.

Figures 9 to 15, inclusive, are diagrammatic views showing various forms of electrical circuits which may be employed in connection with the invention.

In all of the above described views, like characters of reference are employed to designate like parts throughout.

Figure 1:
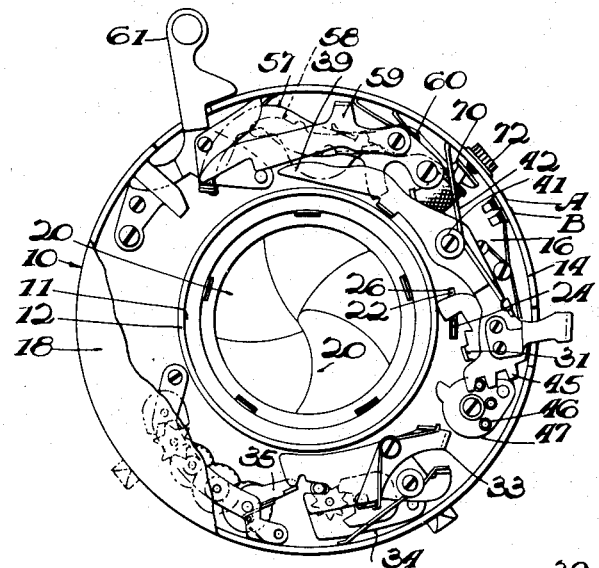
Figure 1 is a fragmentary front elevational view of a shutter casing with the cover plate broken away and showing one form of the improved shutter actuating and synchronizing mechanism applied thereto.
Figure 2:
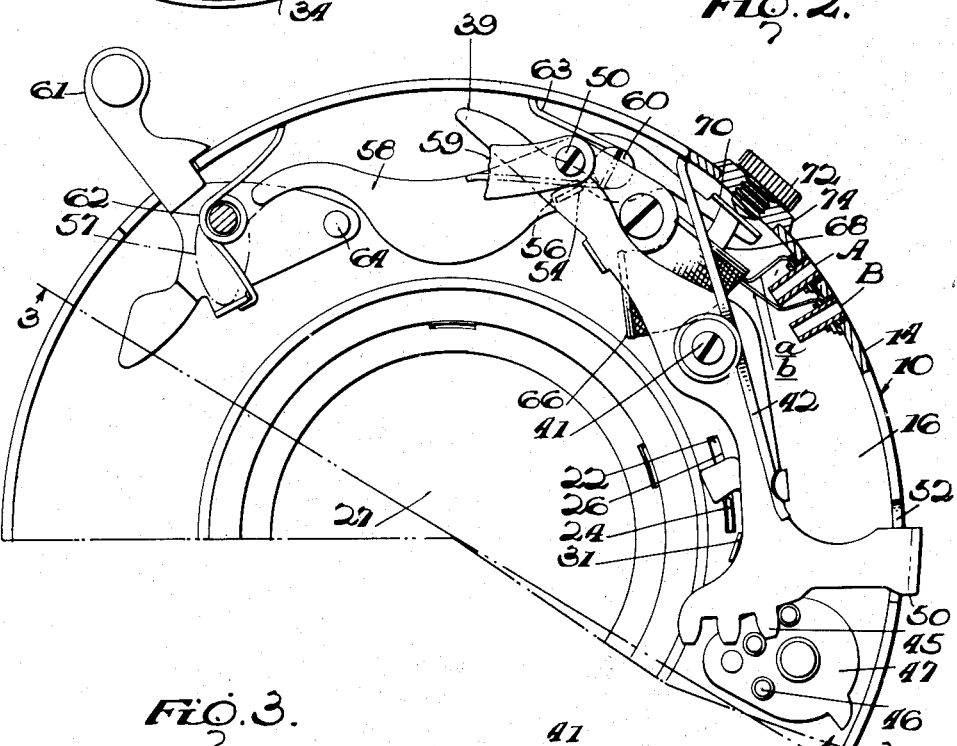
Figure 2 is an enlarged detailed fragmentary view showing the synchronizing and shutter actuating mechanism of Fig. 1.
Figure 3:
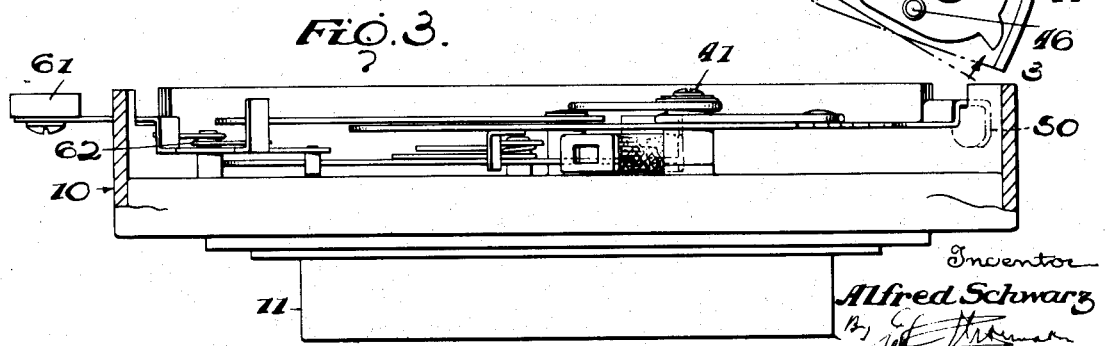
Figure 3 is a fragmentary sectional view taken substantially along the line 3—3 of Fig. 2.

Referring now to Figs. 1 to 3, inclusive, wherein one form of the invention is shown, the electromagnetically operated synchronizing mechanism is shown as being applied to the front end of a camera and is installed within a generally cylindrical ring-like shutter casing 10 having a central opening 11 designed for registry with the lens tube of a camera (not shown) and which is adapted to be opened and closed by means of a Compur type shutter. The casing is provided with outer and inner cylindrical walls 12 and 14 respectively, a rear wall 16 and a removable cover plate 18. A shutter 20 is adapted to have its opening and its closing movements controlled by means of a control ring 22 having a lug 24 formed thereon which projects into the casing 10 through a slot 26.

The specific train of mechanism whereby the ring 22 is actuated to control the opening and closing movements of the shutter 20 forms no part of the present invention and reference may be had to United States patent to Brueck, No. 2,139,561, dated September 6, 1938, for a Shutter operating mechanism, for a full disclosure of a mechanism capable of application to the present shutter. This mechanism serves to shift the position of the ring 22 first in a counter-clockwise direction as viewed in Fig. 2 to open the shutter, and then in a clockwise direction to close the same. Such movement of the shutter is ordinarily substantially instantaneous but, if desired, a shutter retarding mechanism such as is shown in the said patent may be incorporated in the shutter control mechanism.

Referring now to Fig. 1, for convenience the entire control mechanism as disclosed in said patent to Brueck, but as modified by the present invention, has been illustrated. Briefly, the mechanism includes a master control lever 39 which is rockable about a pivot 41 and which is urged toward a normal position by means of a spring 42. A series of teeth 45 formed on one end of the lever 39 cooperate with pins 46 on an oscillatable actuator 47 which, by means of a continuous unchecked return stroke in one direction, serves in cooperation with an upturned shutter actuating arm 31, to effect the instantaneous or retarded movements of the shutter 20. The actuator 47 cooperates with a retarding lever 33 which, together with various associated instrumentalities, in turn cooperates with a contact piece 34 included in an escapement mechanism 35 by means of which a retarding influence may be applied through the various levers and other illustrated parts directly to the shutter 20.

A pair of levers 57 and 59 cooperate with the master lever 39 and a finger release member 61 in bulb and time actuation of the shutter 20. The levers 57 and 59 form no part of the present invention and have been broken away in all of the views of the drawings except Fig. 1 in order that the essential features of the invention may be more clearly recognized. For a description of the mode of operation of these time and bulb control devices, reference may be had to the above noted patent to Brueck.

Referring now to Figs. 2 and 3, the master control lever 39 may be pre-set against the tension of the spring 42 prior to making an exposure, such pre-setting being accomplished by means of an extension 50 which projects through a slot 52 in the casing wall 14. Upon depressing the extension 50 the lever 39 is moved in a clockwise direction and a lug 54 formed thereon is engaged by a notch 56 formed on a detent or releasable latching lever 58 pivoted as at 60 and spring-pressed as at 63.

Release of the master lever 39 for shutter actuating purposes may be effected manually by means of the finger release member 61 which is pivoted as at 62 and which is formed with a pin 64 adapted to engage the detent lever 58 and move the same in a clockwise direction so that the notch 56 moves out of the path of the lug 54 on the master control lever 39. No claim is made herein to any novelty associated with the above described manual release means. Rather the novelty of this application is associated with the electromagnetic releasing means for the lever 39 which will now be fully described and claimed.

Still referring to Figs. 1 to 3 inclusive, a solenoid coil 66 is secured in any suitable manner to the rear wall 16 of the casing 10. The leads for the coil 66 are shown at $a$ and $b$ and are connected to a pair of pup-jacks A and B or other similar receptacles provided on the casing 10. A movable armature or core 68 for the solenoid is secured to an upstanding lug 70 formed on the lever 58 and thus it will be seen that when an electric circuit is completed through the pup-jacks A and B, the core 68 will be attracted into the coil 66 and the lever 58 will be actuated to release the master control lever 39.

In order to accommodate the pivotal turning movement of the detent lever 58, the coil 66 and core 68 are of curved design so that there will be no binding of parts when the latter enters the former.

Where the shutter 20 is to be actuated from a remote point and no flash bulb is employed, the simple electrical circuit consisting of a battery V and a switch S as shown in Fig. 9 may be employed to establish a potential differential across the terminals of the coil 66 and actuate the core 68 and detent lever 58. Where synchronization of the movement of the lever 58 and the firing of a flash bulb is desired, the circuit of Fig. 10 or 11 may be employed. In the former view the coil 66 is arranged in parallel with the battery V and flash bulb F in the circuit while in the latter view a series arrangement of coil and bulb are utilized.

In order to compensate for differences in the time lag between the application of current to the flash bulb and the attainment of the peak of the flash where bulbs of different characteristics are employed, means is provided for varying the instant of release of the master lever 39 by the detent lever 58. Thus, if the lever 39 is released at an earlier or at a later moment, the shutter 20 will arrive at its fully open position at an earlier or a later instant of time respectively, according to whether a bulb having a short or a long time lag characteristic is employed.

Toward this end a limit screw 72 is threadedly received in a bushing 74 on the casing wall 14 and which bears at its inner end against the lug 70 on the end of the lever 58. By rotating the screw 72 in one direction or the other, the armature 68 is advanced toward or retracted from the coil 66 in order that upon closing of the electric circuit through the latter a shorter or a longer stroke of the lever 58 will be required to effect release of the master lever 39. In regard to the above arrangement, it is to be noted that very little mechanical effort is required of the electromagnetic coil 66. The coil is provided, not for the purpose of effecting positive movement of the shutter and its associated parts, but simply to release the energy stored in the spring 42 which is the actual source of energy for operating the shutter.

It is also to be noted that where no flash bulb is employed, movement of the detent lever 58 may be effected by means of the finger release member 61 in the usual manner. Since the coil 66 remains deenergized, the only effort required to move the detent lever is that which is required to overcome the tension of the springs 62 and 63 and the friction of the lug 54 against the walls of the notch 56. Thus the various parts of the electromagnetic mechanism in no manner interferes with normal operation of the shutter and, where the flash bulb is employed, very little electrical energy is consumed in overcoming these frictional and tensional phenomena.

Referring now to Fig. 4 wherein a modified form of the invention is shown, the arrangement of parts is very similar to that shown in the preceding figures and accordingly similar reference characters have been applied to corresponding parts to eliminate detailed description throughout. In this form of the invention the axis of the solenoid coil 66a is straight and the coil is provided with an iron or other magnetic core 76a. The end of the lever 58a, i. e., the lug 70a, is provided with an attached magnetic armature 68a which is pivoted as at 78a in order to insure proper registry of the core and armature surfaces when the coil is energized. The limit screw 72a operates in a manner similar to the screw 72 to shorten or lengthen the air gap between the core and armature to compensate for relative differences in time lag between the shutter and bulb. It will be understood that adjustment of the limit screw 72a will be accompanied by a consideration, not only of the angular pre-positioning of the lever 58a, but also of the difference in the strength of the magnetic field occasioned when the core and armature are at different initial distances from each other.

In Fig. 5 wherein reference characters representing corresponding parts are suffixed b, the adjusting mechanism 70b, 72b for controlling the operative stroke of the lever 58b has been retained and an additional adjusting means for regulating the electromagnetic torque applied to the lever 58b is provided. Additionally, the positions of the solenoid coil 66b and the armature 68b have been interchanged so that the former is attached to the end of the lever 58b while the latter is attached to the casing wall 14b. The core 68b includes an effective magnetic portion 80b and a non-magnetic portion 82b having a threaded portion which extends through a bushing 84b. The end of the portion 82b is provided with a screw head 86b by means of which the position of the core as a whole may be shifted inwardly or outwardly of the casing 10b. A lock nut 88b serves to anchor the core in any desired position of adjustment. By varying the position of the core 68b, the strength of the magnetic field existing between the energized coil and its armature may be varied to effect a quick-acting or a slow-acting solenoidal arrangement which may be utilized to modify the movement of the lever 58b and regulate the time of release of the master control lever 39b. Upon varying the position of core 68b the relative position between lug 54b and notch 56b as determined by the screw 72b is not changed.

In Fig. 6 wherein suffixes c have been applied to corresponding parts, the shape of the lever 58c has been slightly modified and the solenoidal arrangement is connected to the lever at a point on the left-hand end thereof as viewed in this figure. In this form of the invention the coil 66c is adjustably secured to the casing 10c while the core 68c is freely movable therein. A pin and slot connection 90c between the movable core and the end of the lever 58c compensates for the arcuate path of movement of the end of the lever 58c as compared to the straight-line reciprocal movement of the core.

Means is provided for shifting the coil 66c axially inwardly and outwardly of the casing 10c and toward this end an adjusting nut 92c which is rotatably held in position on a plate 94c has threaded engagement at 96c with a shank 98c secured to the coil assembly 66c. The coil is prevented from turning on its axis by means of guides 100c which cooperate with guideways 102c secured to the casing 10c.

The core 68c includes an effective magnetic portion and a non-magnetic portion similar to the disclosure in Fig. 5, and thus it will be seen that in addition to the adjusting means 70c, 72c, 74c, for regulating the stroke of the lever 58c, the arrangement of the solenoid is such that the strength of the magnetic field in which the core 68c operates may be varied.

In order to insure accurate setting of the parts commensurate with a particular manufacture of flash bulb, an indicating mark 104c may be applied to the flat end of the shank 98c which is utilized as a reference mark for the reading of a scale 106c applied to the flat end of the rotatable nut 92c.

In Fig. 7 a modified form of flexible joint between the end of the lever 58d and the core 68d is shown. The end of the lever 58d is provided with a hooked portion 108d which engages a transverse rod 110d carried at the outer end of the core 68d. The core is guided in a sleeve or bearing 112d provided at one end of the coil 66d. The operation is similar to that shown in Fig. 6. The coil 66d may be shiftable as shown in Fig. 6 in order to accommodate the time lag of various bulbs.

Referring now to Fig. 8 wherein the suffixes e are applied to corresponding parts, two solenoids including electromagnetic coils 66e of the iron core type and soft iron armatures 70e are employed on opposite sides of the pivot point 60e of the lever 58e. As shown, one of these coils is mounted on the casing wall 14e and cooperates with its movable armature 70e which is secured medially of the detent lever 58e while the other coil is secured to the rear wall 16e and cooperates with the other armature which is mounted on the end of the lever 58e and which is regulated by means of the adjusting device 72e. It is obvious that the arrangement of coils and armatures may, by slight modification, be reversed and it is also obvious that solenoids having plunger-type armatures may well be substituted for the iron core solenoids shown.

In Figs. 12 to 15 inclusive, various electrical circuits are shown whereby the coils 66f are connected to the flash bulb F. In Fig. 12 a series-parallel arrangement is shown wherein the coils are arranged in series with each other and in a parallel circuit including the bulb F. In Fig. 13 the coils are arranged in parallel with each other and with the bulb F. In Fig. 14 the coils are arranged in series with the lamp and with each other. In Fig. 15 a parallel arrangement of coils is arranged in series with the lamp.

In the form of the invention shown in Fig. 8 the dual arrangement of coils makes it possible to divide the power required between the two coils thereby making it possible to employ smaller coils when the arrangement of shutter operating mechanism imposes space limitations on the design of the synchronizing apparatus.

The invention is not to be limited to the exact arrangement of parts shown in the accompanying drawings or described in this specification as various changes in the details of construction may be resorted to without departing from the spirit of the invention. Only insofar as the invention is particularly pointed out in the accompanying drawings is the same to be limited.

What is claimed is:

1. The combination with a camera shutter having a casing, operating means for the shutter disposed within and substantially enclosed by the casing including a presetting control lever, a releasable latching lever for holding the control lever in its preset position, and spring means normally maintaining the latching lever in its holding position and a trigger lever arranged to release the latching lever from its engagement with the control lever of means operable independently of the trigger lever and without interfering with the operation thereof for moving said latching lever against the action of said spring from its initial operative holding position to a final inoperative position of release comprising an electromagnet also enclosed by said casing, said electromagnet including a coil and an armature, the armature being fixed relative to the casing and the coil being mounted on and movable with the latching lever.

2. The combination with a camera shutter having a casing, operating means for the shutter disposed within and substantially enclosed by the casing including a presetting control lever, a releasable latching lever for holding the control lever in its preset position, and spring means normally maintaining the latching lever in its holding position and a trigger lever arranged to release the latching lever from its engagement with the control lever of means operable independently of the trigger lever and without interfering with the operation thereof for moving said latching lever from an initial operative holding position to a final inoperative position of release comprising an electromagnet also enclosed by said casing, said electromagnet including a coil having a curved axis secured to the casing and an armature also having a curved axis secured to and movable with the latching lever, said coil being adapted to telescopically receive therein the armature upon energization of the coil.

3. The combination with a camera shutter having a casing, operating means for the shutter including a presetting control lever, a releasable latching lever for holding the control lever in its preset position, and a trigger lever arranged to release the latching lever from its engagement with the control lever of means operable independently of the trigger lever and without interfering with the operation thereof for moving said latching lever from its initial operative holding position to a final inoperative position of release comprising an electromagnet, a flash bulb in the circuit, said electromagnet including a coil having a curved axis secured to the casing and an armature also having a curved axis secured to and movable with the latching lever, said coil being adapted to telescopically receive therein the armature upon energization of the coil.

4. The combination with a camera shutter, operating means for the shutter including a presetting control lever, and a releasable latching lever pivoted to the casing for holding the control lever in its preset position, of means for moving said latching lever from its initial operative holding position to a final inoperative position of release comprising a pair of electromagnets, each electromagnet including a coil part and a core part, one part of each electromagnet being mounted on the latching lever and the other part being mounted on the casing, said electromagnets operating on the latching lever on opposite sides of its pivotal point.

5. The combination with a camera shutter having a casing, operating means for the shutter disposed within and substantially enclosed by the casing including a presetting control lever, a latching lever for holding the control lever in its preset position spring means normally maintaining the latching lever in its holding position and a trigger lever arranged to release the latching lever from its engagement with the control lever, of means operable independently of the trigger lever and without interfering with the operation thereof for moving said latching lever against the action of said spring from its initial operative holding position to a final inoperative position of release comprising an electromagnet also enclosed by said casing, said electromagnet including a coil part and an armature part, one of said parts being connected to the latching lever by a lost motion connection.

6. The combination with a camera shutter having a casing, operating means for the shutter disposed within and substantially enclosed by the casing including a presetting control lever, a latching lever for holding the control lever in its preset position, spring means normally maintaining the latching lever in its holding position and a trigger lever arranged to release the latching lever from its engagement with the control lever, of means operable independently of the trigger lever and without interfering with the operation thereof for moving said latching lever against the action of said spring from its initial operative holding position to a final inoperative position of release comprising an electromagnet including a coil and an armature, the coil being fixed relative to the the casing and the armature being connected to the latching lever by a lost motion connection.

7. The combination with a camera shutter having a casing operating means for the shutter disposed within and substantially enclosed by the casing including a presetting control lever, a latching lever for holding the control lever in its preset position, spring means normally maintaining the latching lever in its holding position and a trigger lever arranged to release the latching lever from its engagement with the control lever, of means operable independently of the trigger lever and without interfering with the operation thereof for moving said latching lever against the action of said spring from its initial operative holding position to a final inoperative position of release comprising an electromagnet including a coil and an armature, the coil being fixed relative to the casing and the armature being connected to the latching lever by a lost motion connection, and means for adjusting the position of the coil relative to the armature.

8. The combination with a camera shutter having a casing, operating means for the shutter disposed within and substantially enclosed by the casing including a presetting control lever, a releasable latching lever for holding the control lever in its preset position, spring means normally maintaining the latching lever in its holding position, and a trigger lever arranged to release the latching lever from its engagement with the control lever, of means operable independently of the trigger lever and without interfering with the operation thereof for moving said latching lever against the action of said spring from its initial operative holding position to a final inoperative position of release comprising an electromagnet also enclosed by said casing, said electromagnet including a coil part and an armature part, one of said parts being fixed relative to the casing and the other part being mounted on and movable with the latching lever, whereby when the electromagnet is energized the latching lever will be moved from its holding position to its inoperative position.

9. The combination with a camera shutter having a casing, operating means for the shutter disposed within and substantially enclosed by the casing including a presetting control lever, a releasable latching lever for holding the control lever in its preset position, spring means normally maintaining the latching lever in its holding position, and a trigger lever for moving the latching lever to its release position, of means operable independently of the trigger lever and without interfering with the operation thereof for moving said latching lever against the action of said spring from its initial operative holding position to a final inoperative position of release comprising an electromagnet also enclosed by said casing, said electromagnet including a coil and an armature, the coil being fixed relative to the casing and the armature being mounted on and movable with the latching lever, whereby when the electromagnet is energized the latching lever will be moved from its holding position to its inoperative position.

10. The combination with a camera shutter having a casing, operating means for the shutter disposed within and substantially enclosed by the casing including a presetting control lever, a latching lever for holding the control lever in its preset position, spring means normally maintaining the latching lever in its holding position and a trigger lever for moving the latching lever from its holding position to release the control lever, of means operable independently of the trigger lever and without interfering with the operation thereof for moving said latching lever against the action of said spring from its initial operative holding position to a final inoperative position of release comprising an electromagnet also enclosed by the casing, said electromagnet including a coil part and an armature part, one of said parts being fixed relative to the casing and the other part being mounted on and movable with the latching lever, whereby when the electromagnet is energized the latching lever will be moved from its holding position to its inoperative position, and means for adjustably moving the latching lever to vary its initial holding position and thus vary the extent of the movement of the latching lever to release the control lever.

ALFRED SCHWARZ.